3,102,881
CELLULOSE DERIVATIVES AND SHAPED STRUCTURES THEREOF
Robert Otto Osborn, Snyder, and Alfred Johannes Porck, Tonawanda, N.Y., assignors to E. I. du Pont de Nemours and Company, Wilmington, Del., a corporation of Delaware
No Drawing. Filed Mar. 30, 1960, Ser. No. 18,467
6 Claims. (Cl. 260—231)

This invention relates to cellulose derivatives and to cellulose derivatives in the form of films. More particularly, it relates to cellulose derivative films with improved properties.

In the manufacture of cellulosic films, in particular those from regenerated cellulose, it is necessary to incorporate a softening agent to impart flexibility and some degree of toughness or durability to the film. Attempts to increase the durability of the film by the incorporation of a higher concentration of softener are generally complicated by the fact that the film tends to become tacky and steps such as sizing the film are necessary to avoid blocking of the film when it is collected in rolls or stacks. Also, films containing high concentrations of softening agent show poor adherability to the moistureproof coatings applied thereto.

Accordingly, it is an object of this invention to provide a durable cellulosic film and, more particularly, to provide a durable cellulosic film which does not require the use of softening agents to condition it for application in the packaging field. A further object is to provide a method for the production of an improved cellulosic film. The foregoing and related objects will more clearly appear from the description which follows.

These objects are realized by the present invention which briefly stated, comprises reacting an oxyalkylating agent having from 6 to 20 carbon atoms in the alkyl group with cellulose for a time sufficient to produce a reaction product containing from 0.5 to 15% by weight of hydroxyalkyl groups, based on the weight of cellulose; forming a composition of said reaction product from which oxyalkylated cellulose may be regenerated; passing said composition in the form of a shaped structure, e.g., a film, through a coagulating and regenerating bath to produce a shaped structure of gel regenerated oxyalkylated cellulose; washing said structure, and thereafter drying said structure whereby to produce a shaped structure of regenerated hydroxyalkyl cellulose containing from 0.5 to 15% by weight, based on the weight of cellulose, of hydroxyalkyl groups having from 6 to 20 carbon atoms.

The degree of polymerization of the cellulose from which the oxyalkylated products of this invention are produced may vary from 200 to at least 900. For attainment of desirable strength characteristics in film structures formed from these cellulosic products the degree of polymerization should be at least 450. Oxyalkylated cellulose products derived from a cellulose of a D.P. higher than 900 can also be made by the process of this invention, the only complication being that solutions of these products are considerably more viscous and may require special techniques for conveying through process pipes and forming into shaped structures. Degree of polymerization (D.P.) is determined by measuring the viscosity of a cupriethylene diamine solution of the cellulose and relating viscosity to D.P. as described in TAPPI test T–230.

Oxyalkylating agents (i.e., epoxyalkanes) containing from 6 to 20 carbon atoms are suitable for purposes of this invention. Thus, cellulose may be oxylated with one or more of the following: 1,2-epoxyhexane, 1,2-epoxyheptane, 1,2-epoxyoctane, 1,2-epoxynonane, epoxydecane, epoxyundecane, epoxydodecane, epoxytridecane, epoxytetradecane, epoxypentadecane, epoxyhexadecane, epoxyheptadecane, epoxyoctadecane, epoxynonadecane and epoxyeicosane.

The amount of oxyalkylating agent incorporated in the cellulose may vary from 0.5 to 15% by weight based on the weight of the cellulose. For film-forming purposes, the preferred range is from 3 to 7% by weight of the oxyalkylating agent. The oxyalkylating agent reacts readily with alkali cellulose at temperatures ranging from 25° C. to 70° C., the preferred reaction temperature being within the range of from 25° C. to 40° C. In the interests of reaction efficiency, it is desirable to carry out the oxyalkylation reaction at a pressure sufficiently reduced below atmospheric pressure to maintain the oxyalkylating agent in the vapor phase at the reaction temperature employed. For example, the reaction between epoxyoctane and alkali cellulose at room temperature should be carried out at a pressure of about 10 mm. of mercury.

Conversion of the oxyalkylated cellulose into a liquid composition which may be readily extruded into film, filaments, and like, shaped structures, using existing equipment, may be accomplished by any of the expedients heretofore employed in the production of regenerated cellulose films and filaments. Thus, the oxyalkylated cellulose may be xanthated and the xanthate then dissolved in aqueous sodium hydroxide to form viscose; or alternatively, the etherified cellulose may be dissolved in an ammoniacal copper solution to form a cupraammonium cellulose. The resulting solutions are adjusted to the desired viscosity (e.g., by ripening), deaerated, filtered, extruded into a coagulating bath in film or filament form, regenerated, purified and dried as in the conventional production of regenerated cellulose structures.

In the preferred embodiment of this invention, cellulose in the form of wood pulp sheets is steeped in 18% caustic solution for from 30 minutes to 60 minutes at a temperature of 25° C. to 35° C., the excess caustic solution is removed from the pulp sheet by pressing and the pressed sheets of steeped wood pulp are then shredded in a conventional shredder until uniform crumbs of alkali cellulose are obtained. Preferably, the cellulose is so chosen that its degree of polymerization is between 450 and 650. The shredded alkali cellulose is then placed in a baratte, and the baratte is closed and evacuated. An oxyalkylating agent, such as 1,2-epoxyoctane, is then introduced into the evacuated vessel. After the oxyalkylating agent has reacted to the desired extent, preferably in the range of 3% to 7% of the weight of the original cellulose, carbon disulfide vapors are introduced into the vessel to form the xanthate of the etherified cellulose. The xanthated cellulose product is then dispersed in additional caustic solution, the resulting viscose solution is filtered to remove undispersed particles, deaerated to remove air bubbles, and cast into film by extruding through a hopper slit into successive baths of ammonium sulfate and sulfuric acid to coagulate and regenerate the cellulose; the regenerated film is then washed, purified and dried in the general manner described in Brandenberger U.S. Patent 1,548,864.

The following examples of additional preferred embodiments will further serve to illustrate the principles and practice of this invention. In these examples parts and percentages are by weight unless otherwise indicated.

*Example 1*

A reaction vessel provided with a stirrer was charged with 300 parts of high molecular weight alkali cellulose having a degree of polymerization (D.P.) of about 600 and 38 parts of octylene oxide (approximately 85% 2,3-epoxyoctane and 15% 1,2-epoxyoctane). Composition of the alkali cellulose was approximately 33% cellulose and 15% sodium hydroxide. The vessel was then evacuated to approximately 10 mm. of mercury, and the reaction mixture therein was allowed to stand at room temperature for four hours. The alkali cellulose was then stirred to achieve more uniform penetration of the epoxyoctane vapors. An additional 4.1 parts of epoxyoctane was introduced and the reaction mixture was set aside for twenty hours.

The oxyalkylated cellulose was then xanthated by introducing 62.8 parts of carbon disulfide and allowing the reaction to proceed over a period of two hours at a temperature of 25° C. to 40° C. The xanthated product was converted into viscose by mixing with 244 parts of 18.8 sodium hydroxide solution and 488 parts of water. After filtration and deaeration the viscose was cast on a glass plate with a 25-mil opening casting knife, the cast film was coagulated in a 40% ammonium sulfate solution for four minutes and then regenerated in an 8% sulfuric acid bath for five minutes. The gel film was washed in running water for one hour and then dried on a ferro-type plate.

Properties of the dried film, which was 2.3 mils thick and contained approximately 3% of epoxyoctane, were as follows:

Tenacity_____ 23,000 p.s.i.
Modulus_____ 950,000 p.s.i.
Elongation_____ 48%.
Stress-flex_____ 92 cycles.
Tear strength_____ 28.5 grams/mil.
Impact strength_____ 7.2 kg./cm./mil.

A control film, comparable to a commercially produced cellophane film, containing approximately 15% of glycerol softening agent and made from regenerated cellulose of degree of polymerization about 300 which was not oxyalkylated, showed the following properties:

Tenacity_____ 18,000 p.s.i.
Modulus_____ 700,000 p.s.i
Elongation_____ 17%.
Stress-flex_____ 37 cycles.
Tear strength_____ 5 grams/mil.
Impact strength_____ 3.4 kg./cm./mil.

Impact strength and tear strength of the films were measured by the procedures described by D. W. Flierl, Modern Packaging, 25, 129 (1951).

Stress-flex was measured in the following manner. A sample of film 4″ by 7″ is placed between two rubber-faced clamps 1″ apart. One clamp is stationary, the other slides back and forth by gravity on two rods flexing the film as the whole assembly rotates, until the film sample breaks. The stress-flex value indicates the number of strokes of the movable clamp until the film sample breaks.

Tenacity, elongation and tensile modulus measurements were made at 50% relative humidity and 23° C. They were determined by elongating the film sample (¼″ wide sample) in an Instron tensile tester at a rate of 100%/minute until the sample breaks. The force applied at the break in pounds per square inch (p.s.i) is the tensile strength. The elongation is the percent increase in the length of the sample at breakage. Initial tensile modulus in pounds per square inch (p.s.i) is directly related to film thickness. It is obtained from the slope of the stress/strain curve at an elongation of 1%; both tensile strength and initial tensile modulus are based upon the initial cross-sectional area of the sample.

Example 2

A reaction vessel fitted with an addition tube, gas inlet and a gas outlet tube was charged with 300 parts of high molecular weight alkali cellulose (D. P. 900, 33% cellulose, 15% sodium hydroxide). Into this vessel there was introduced 38 parts of 1,2-epoxydodecane and the mixture was reacted for approximately twenty hours after which it was xanthated by the addition of 62.8 parts of carbon disulfide. The xanthated product was formed into viscose by mixing with 244 parts of 18.8% sodium hydroxide solution and 488 parts of water, the viscose was filtered and deaerated and then cast on a glass plate with a 25-mil opening casting knife. The cast film was regenerated in 40% ammonium sulfate solution and thereafter in 8% sulfuric acid, washed and dried. The dried film had an impact value of 5.9 kg./cm./mil and tear strength of 34 grams/mil whereas a control film of approximately the same degree of polymerization but not oxyalkylated showed a tear strength of only 20 grams/mil. Coating of the film of oxyalklated cellulose with a 91.5/8.5 weight percent vinylidene chloride/acrylonitrile copolymer gave a film that showed a heat seal value of 710 grams as compared with a similarly coated film from non-oxyalkylated regenerated cellulose which showed a value of 270 grams.

Example 3

Following the procedure of Example 1, 300 parts of alkali cellulose with a D. P. of approximately 900 was reacted with 38 parts of epoxyoctadecane for a period of twenty hours. The oxyalkylated product was xanthated by introduction of 62.8 parts of carbon disulfide, the xanthated product was converted into viscose by mixing with 244 parts of 18.8% caustic solution and 488 parts of water. Films cast from this viscose, purified and dried, showed an impact value of 5.6 kg./cm./mil and a tear strength of 23 grams/mil. A control film of comparable D. P. which was not oxyalkylated showed a tear strength of 20 grams. Another control film which was not oxyalylated and which had a degree of polymerization of about 300 and contained a softening agent showed an impact value of 3.4 and a tear strength of only 5 grams. Still another control film made from the high D. P. cellulose and oxyalkylated with ethylene oxide to the extent of 6% of the cellulose weight showed an impact value of 2.2 kg./cm./mil and a tear strength of 4 grams.

Example 4

Following the procedure of Example 1, 300 grams of alkali cellulose (D. P. 600, 33% cellulose, 15% NaOH) in a 5-liter, three-necked flask was reacted with 46 ml. of a mixture of 1,2-epoxyhexadecane and 1,2-epoxyoctadecane dissolved in 330 ml. of cyclohexane. The reaction was carried out under a reduced pressure of 10 mm. of mercury for a period of 24 hours at room temperature. Excess cyclohexane and unreacted epoxide were removed by suction filtration with exclusion of air; the reaction product was washed twice in the reaction vessel with 500 ml. of dry chloroform and once with 300 ml. of cyclohexane and thereafter remaining occluded solvents were removed by evacuation of the reaction vessel overnight. The resulting oxyalkylated cellulose was xanthated by reaction with 50 ml. of carbon disulfide over a period of four hours at approximately 35° C.; the xanthated product was converted into viscose by mixing with 300 grams of 18.8% sodium hydroxide solution and 634 ml. of water. Films were cast as described in Example 1, and after washing and drying were found to be considerably tougher, to have higher impact and tear values than a corresponding cellulose which had not been oxyalkylated.

Example 5

Following the procedure of Example 1, alkali cellulose having a D. P. of abut 450 was reacted with octylene oxide, the oxyalkylated product was xanthated, converted into viscose and cast into a film, purified and dried. The dried film showed better strength characteristics and better adherability of coatings than a non-oxyalkylated control film.

Example 6

Following the procedure of Example 1, 335 parts of alkali cellulose with a degree of polymerization (D. P.) of about 900 was reacted with 20 parts of 1,2-epoxypentane for a period of 20 hours. The oxyalkylated product was xanthated, converted into viscose and cast into a film, purified and dried. The resulting 2-mil thick film showed an impact strength value of 4.2 kg./cm./mil and a tear strength of 15.5 grams/mil; a control film of the same D. P. but not oxyalkylated showed a tear strength of 20 grams/mil.

*Example 7*

Following the procedure of Example 1, 335 parts of alkali cellulose with a D. P. of approximately 600 was reacted with 33 parts of 1,2-epoxybutane for a period of 20 hours. The oxyalkylated product was xanthated, converted into viscose and cast into film, purified and dried. The resulting 2-mil film showed a tear strength of 14.5 grams/mil as compared with a control film of the same D. P. but not oxyalkylated, which had a value of 20 grams/mil.

From the foregoing description and examples it is apparent that this invention provides products from cellulose which can be formed into shaped structures, such as films, characterized in that they are highly durable without the addition of softening agents. As shown in the preceding Examples, films made from these oxyalkylated products show better strength properties than corresponding control films which were not oxyalkylated or control films of regenerated cellulose containing softening agents similar to commercial cellophane films. In contrast, films made from oxyalkylated cellulose products, wherein the oxyalkylating agent contained fewer than six carbon atoms, such as ethylene oxide or propylene oxide, did not show improvement in strength properties over a non-oxyalkylated cellulose control film.

We claim:

1. As a new composition of matter a hydroxyalkyl ether of cellulose containing from 0.5% to 15% by weight of hydroxyalkyl groups based on the weight of cellulose, said hydroxyalkyl groups containing from 8 to 20 carbon atoms, and said cellulose having a degree of polymerization of at least 200.

2. As a new composition of matter a hydroxyalkyl ether of cellulose containing from 3% to 7% by weight of hydroxyalkyl groups based on the weight of cellulose, said hydroxyalkyl groups containing from 8 to 20 carbon atoms, and said cellulose having a degree of polymerization of at least 200.

3. A self-supporting, durable film consisting essentially of a hydroxyalkyl ether of cellulose containing from 0.5% to 15% by weight of hydroxyalkyl groups based on the weight of cellulose, said hydroxyalkyl groups containing from 8 to 20 carbon atoms and said cellulose having a degree of polymerization of at least 450.

4. A self-supporting, durable film consisting essentially of a hydroxyalkyl ether of cellulose containing from 3% to 7% by weight of hydroxyalkyl groups based on the weight of cellulose, said hydroxyalkyl groups containing from 8 to 20 carbon atoms and said cellulose having a degree of polymerization of at least 450.

5. The process which comprises reacting vapors of an epoxyalkane having from 8 to 20 carbon atoms with cellulose having a degree of polymerization of at least 200 for a time sufficient to produce a reaction product containing from 0.5 to 15% by weight of hydroxyalkyl groups, based on the weight of the cellulose.

6. The process which comprises reacting vapors of an epoxyalkane having from 8 to 20 carbon atoms with cellulose having a degree of polymerization of at least 450 for a time sufficient to produce a reaction product containing from 0.5% to 15% by weight of hydroxyalkyl groups, based on the weight of the cellulose.

References Cited in the file of this patent

UNITED STATES PATENTS

| | | |
|---|---|---|
| 1,863,208 | Schorger | June 14, 1932 |
| 1,941,278 | Schorger | Dec. 26, 1933 |
| 2,057,163 | Richter | Oct. 13, 1936 |
| 2,173,470 | Broderick | Sept. 19, 1939 |